United States Patent
Agrawal et al.

(10) Patent No.: US 8,217,210 B2
(45) Date of Patent: *Jul. 10, 2012

(54) INTEGRATED GASIFICATION—PYROLYSIS PROCESS

(75) Inventors: Rakesh Agrawal, West Lafayette, IN (US); Navneet R. Singh, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 691 days.

This patent is subject to a terminal disclaimer.

(21) Appl. No.: 12/199,359

(22) Filed: Aug. 27, 2008

(65) Prior Publication Data

US 2009/0084666 A1 Apr. 2, 2009

Related U.S. Application Data

(60) Provisional application No. 60/968,190, filed on Aug. 27, 2007, provisional application No. 61/034,043, filed on Mar. 5, 2008.

(51) Int. Cl.
*C07C 1/00* (2006.01)
*C10L 3/00* (2006.01)
*C01B 3/36* (2006.01)

(52) U.S. Cl. ....... 585/240; 585/242; 48/127.7; 48/197 R

(58) Field of Classification Search .......... 585/240, 585/242, 254; 48/127.7, 197 R; 423/418.2, 423/650; 201/13, 15, 21
See application file for complete search history.

(56) References Cited

U.S. PATENT DOCUMENTS

| | | | |
|---|---|---|---|
| 4,678,860 A * | 7/1987 | Kuester | 585/14 |
| 5,959,167 A * | 9/1999 | Shabtai et al. | 585/242 |
| 6,846,402 B2 * | 1/2005 | Hemighaus et al. | 208/14 |
| 6,863,878 B2 * | 3/2005 | Klepper | 423/650 |
| 7,500,997 B2 * | 3/2009 | Norbeck et al. | 48/127.7 |
| 7,578,927 B2 * | 8/2009 | Marker et al. | 208/67 |
| 7,691,159 B2 * | 4/2010 | Li | 44/605 |
| 7,816,570 B2 * | 10/2010 | Roberts et al. | 585/240 |
| 7,833,512 B2 * | 11/2010 | Pulkrabek et al. | 423/650 |
| 2005/0232833 A1 | 10/2005 | Hardy et al. | |
| 2007/0129449 A1 | 6/2007 | Topf et al. | |

OTHER PUBLICATIONS

J.M. Tarascon & M. Armand., "Issues and challenges facing rechargeable lithium batteries", (Nature, vol. 414, Nov. 15, 2001), pp. 359-367.

Jason Hill, Erik Nelson, David Tilman, Stephen Polasky, and Douglas Tiffany, "From the Cover: Environmental, economic, and energetic costs and benefits of biodiesel and ethanol biofuels", (Proceedings of the National Academy of Sciences of the United States of America, (Nov. 2006), pp. 11206-11210.

Rakesh Agrawal, Navneet R. Singh, "Process for Producing Synthetic Liquid Hydrocarbon", U.S. Appl. No. 60/843,678, filed Sep. 11, 2006.

Ayse E. Putun, H. Ferdi Gercel, O. Mete Kockar, Ozgul Eg, Colin E. Snape and Ersan Putun, "Oil production from an arid-land plant: fixed-bed pyrolysis and hydropyrolysis of Euphorbia rigida", (Jan. 1996), Fuel, vol. 75, No. 11; pp. 1307-1312.

(Continued)

*Primary Examiner* — Nina Bhat
(74) *Attorney, Agent, or Firm* — Cedric A. D'Hue; Bingham Greenebaum Doll LLP

(57) ABSTRACT

A method for producing liquid hydrocarbons from biomass includes hydropyrolizing biomass with a gaseous exhaust stream formed from one of gasification and reforming of carbon containing moiety (CCM). The gaseous exhaust stream includes hydrogen ($H_2$) and at least one of carbon monoxide (CO), carbon dioxide ($CO_2$) and water ($H_2O$).

39 Claims, 8 Drawing Sheets

OTHER PUBLICATIONS

A.E. Putun, O.M. Kockar, S. Yorgun, H.F. Gercel, J. Andersen, C.E. Snape, E. Putun, "Fixed-bed pyrolysis and hydropyrolysis of sunflower bagasse: Product yields and compositions", Fuel Processing Technology, (Mar. 1995), pp. 46-62.

Kurt A. Rosentrater, "Expanding the Role of Systems Modeling: Considering Byproduct Generation from Biofuel Production", Ecology and Society, (2005), pp. 1-12.

R.L. Graham, R. Nelson, J. Sheehan, R.D. Perlack, and L.L. Wright, "Current and Potential U.S. Corn Stover Supplies", (2007), Agron. J. 99, pp. 1-11.

J.D. Rocha, C.A. Luengo, C.E. Snape, "Hydrodeoxygenation of Oils from Cellulose in Single and Two-Stage Hydropyrolysis," Renewable Energy, Pergamon Press, Oxford, GB, vol. 9, No. 1 (Sep. 12, 1996), pp. 950-953.

International Search Report—PCT/US2008/074463 (Feb. 18, 2009).

U.S. Appl. No. 12/199,425, filed Aug. 27, 2008.

H. Bos, F. van Dongen, "Shell Coal Gasification Process", Gasification Conference Pittsburgh, Sep. 2005.

K. Aasberg-Petersen, T.S. Christensen, I. Dybkjaer, J. Sehested, M. Ostberg, R.M. Coertzen, M.J. Keyser, A.P. Steynberg, "Synthesis Gas Production for FT Synthesis" Studies in Surface Science and Catalysis, 2004.

Niels Fabricius, "Pearl GTL: Managing the Challenges of Scaling Up", Fundamentals of Gas to Liquids, 2005.

George W. Huber, Sara Iborra, and Avelino Corma, "Synthesis of Transportation Fuels from Biomass: Chemistry, Catalysts, and Engineering", Chem. Rev. (Jun. 2006), 106, pp. 4044-4098.

Dinesh Mohan, Charles U. Pittman, Jr., and Philip H. Steele, "Pyrolysis of Wood/Biomass for Bio-oil: A Critical Review", Energy & Fuels (2006), 20, pp. 848-889.

A.V. Bridgwater, G.V.C. Peacocke, "Fast pyrolysis processes for biomass", Renewable and Sustainable Energy Reviews (Apr. 2000); 1999 Elsevier Science Ltd., pp. 1-73.

Douglas C. Elliott, "Historical Developments in Hydroprocessing Bio-oils", Energy & Fuels (Jan. 2007), 21, pp. 1792-1815.

D.C. Elliott and G.G. Neuenschwander, "Liquid Fuels by Low-Severity Hydrotreating of Biocrude, Developments in Thermochemical Biomass Conversion", vol. 1, , Blackie Academic & Professional, London: (1996), pp. 611-621.

A. V. Bridgwater, "Renewable Fuels and Chemicals by Thermal Processing of Biomass", Chemical Engineering Journal 91 (2003), pp. 87-102.

"The Hydrogen Economy, Opportunities, Costs, Barriers, and R & D Needs", National Research Counsel and National Academy of Engineering, (The National Academies Press, Washington, D.C.), (2004), pp. 1-257.

Mark C. Woods et al., Research and Development Solutions, LLC (RDS), "Cost and Performance Baseline for Fossil Energy Plants", vol. 1: Bituminous Coal and Natural Gas to Electricity—Final Report, (May 2007), pp. 1-508.

Mark J. Prins, Krzysztof J. Ptasinski, Frans J.J.G. Janssen, "Exergetic optimization of a production process of Fischer—Tropsch fuels from biomass", Fuel Processing Technology 86 (2004), pp. 375-389.

X. Li, J.R. Grace, A.P. Watkinson, C.J. Lim, A. Ergudenler, "Equilibrium modeling of gasification: a free energy minimization approach and its application to a circulating fluidized bed coal gasifier", Fuel 80 (2001), Department of Chemical and biological Engineering, University of British Columbia, pp. 195-207.

Zhao Yuehong, Wen Hao, Xu Zhihong, "Conceptual design and simulation study of a co-gasification technology", Energy Conversion and Management 47 (2006) pp. 1416-1428.

M. Ringer, V. Putsche, and J. Scahill, "Large-Scale Pyrolysis Oil Production: A Technology Assessment and Economic Analysis", NREL—National Renewable Energy Laboratory, Technical Report, NREL/TP-510-37779, (Nov. 2006), pp. 1-93.

M.D. Rutkowski, U.S. Department of Energy—"Hydrogen Program, Production Case Studies", http://www.hydrogen.energy.gov.h2a product studies.html, (2005), pp. 1-58.

M. K. Mann, U.S. Department of Energy—DOE H2A Analysis, http://www.hydrogen.energy.gov.h2a analysis.html, (2005). pp. 1-97.

J. Dilcio Rocha, Carlos A. Luengo, Colin E. Snape, "The scope for generating bio-oils with relatively low oxygen contents via hydropyrolysis", Organic Geochemistry 30 (1999), pp. 1527-1534.

Hasan Ferdi Gercel, Ayse Eren Putun, Ersan Putun, "Hydropyrolysis of Extracted Euphorbia rigida in a Well-Swept Fixed-Bed Tubular Reactor", (Apr. 2001), Energy Sources, 24, pp. 423-430.

Rakesh Agrawal, Navneet R. Singh, Fabio H. Ribeiro, and W. Nicholas Delgass, "Sustainable Fuel for the transportation sector", Proceedings of the national Academy of Sciences of the United States of America, (Apr. 2007), pp. 4828-4833.

* cited by examiner

Prior Art
Integrated Gasification Combined Cycle (IGCC) without $CO_2$ capture for electricity production Prior Art
Conventional Biomass Pyrolysis Process Integrated Carbon Containing Moiety (CCM) gasifier/reformer-Biomass fast hydropyrolysis process Novel process integration configuration where hot syngas from Carbon Containing Moiety (CCM) reformer is used to supply $H_2$ and process heat for biomass hydropyrolysis Novel process integration configuration where hot syngas from Carbon Containing Moiety (CCM) Gasifier/Reformer is used to supply $H_2$ and process heat for biomass hydropyrolysis and sand circulation no longer needed Figure 6. Novel reactor configuration for simultaneous gasification and pyrolysis in a single reactor to supply in-situ $H_2$ from syngas and process heat for biomass hydropyrolysis Novel process integration configuration where reforming of gaseous stream from biomass hydropyrolysis is used to supply hot syngas and process heat and sand circulation is not needed

INTEGRATED GASIFICATION—PYROLYSIS PROCESS

CROSS REFERENCE TO RELATED APPLICATIONS

This application claims priority to U.S. Provisional Patent Application No. 60/968,190, filed on Aug. 27, 2007 and U.S. Provisional Patent Application No. 61/034,043, filed on Mar. 5, 2008, the entire contents of which are herein incorporated by reference.

BACKGROUND OF THE INVENTION

Currently available biofuel processes have cost and efficiency limitations. Fermentation-based processes for alcohols from non-sugar portions of the biomass such as cellulose, hemicellulose and lignin are not cost-effective (1). The biomass to liquid processes using biomass gasification/Fischer-Tropsch (FT) process (BTL process) is relatively capital intensive and generally requires large-scale plants. The fast-pyrolysis processes provide efficient (e.g., ~75%) and relatively low cost methods to produce bio-oil (2) and there are several reactor designs available (3). However, the bio-oil from a fast-pyrolysis has extremely high oxygen contents (e.g., ~35-40 wt %) and its energy content is only half of petroleum and similar to that of the original biomass (e.g., ~17 MJ/kg). Furthermore, bio-oils do not easily blend with petroleum products. This necessitates the subsequent upgrading of this bio-oil by hydrodeoxygenation (HDO) using $H_2$ in the presence of a catalyst (1, 4, 5). The bio-oils tend to polymerize and condense with time during shipment and storage and are known to cause coking and gum formation in the HDO reactor and associated lines (3, 6). To overcome these problems, fixed-bed pyrolysis in presence of pure $H_2$ and sulfided catalysts (FeS, Ni—Co or Co—Mo on $\gamma$-$Al_2O_3$) has been proposed (7, 8). However, all such hydropyrolysis studies have been conducted in fixed bed mode and are inadequate for providing the technical information needed for the design of a commercial circulating or fluidized bed fast-hydropyrolysis reactor.

BRIEF SUMMARY OF THE INVENTION

Conventional wisdom points that $H_2$ required for hydropyrolysis will either be derived from steam reforming of methane or coal/biomass gasification which will lead to addition of $CO_2$ in the atmosphere. Indeed, Rocha et al. suggest use of gasification to supply the needed $H_2$ (9). In their experiments, Rocha et al. used pure $H_2$ stream for hydropyrolysis.

On the other hand, conversion of Natural Gas (NG), consisting mostly of methane to Liquid by partial oxidation of methane to synthesis gas (syngas) and subsequent conversion of syngas, a mixture of $H_2$, CO, $CO_2$ and $H_2O$ is widely pursued (GTL process) (10). Meanwhile, conversion of NG to $H_2$ for the '$H_2$-economy' is also being pursued for the transition period (11). A number of technological challenges exist for this transition, namely $H_2$ storage, fuel cell cost, reliability etc.

Another approach to decrease carbon footprint of coal-to-liquid processes is co-feeding of biomass to coal gasifier. It has been shown that up to 30 wt % biomass can be co-fed to coal gasifier by Shell (12). Shell also studied co-feeding of sewage and paper sludge, carbon black etc.

One aspect of the present invention is to develop a low-cost process by using biomass fast hydropyrolysis to produce liquid fuel that will provide the high yield of liquid fuel from a given quantity of biomass. $H_2$ as well as heat required for the biomass fast hydropyrolysis is supplied by the syngas derived from the gasification or reforming of Carbon Containing Moiety (CCM).

BRIEF DESCRIPTION OF THE DRAWINGS

The above-mentioned aspects of the present invention and the manner of obtaining them will become more apparent and the invention itself will be better understood by reference to the following description of the embodiments of the invention taken in conjunction with the accompanying drawings, wherein.

Corresponding reference characters indicate corresponding parts throughout the several views.

DETAILED DESCRIPTION OF THE INVENTION

Figure 1:
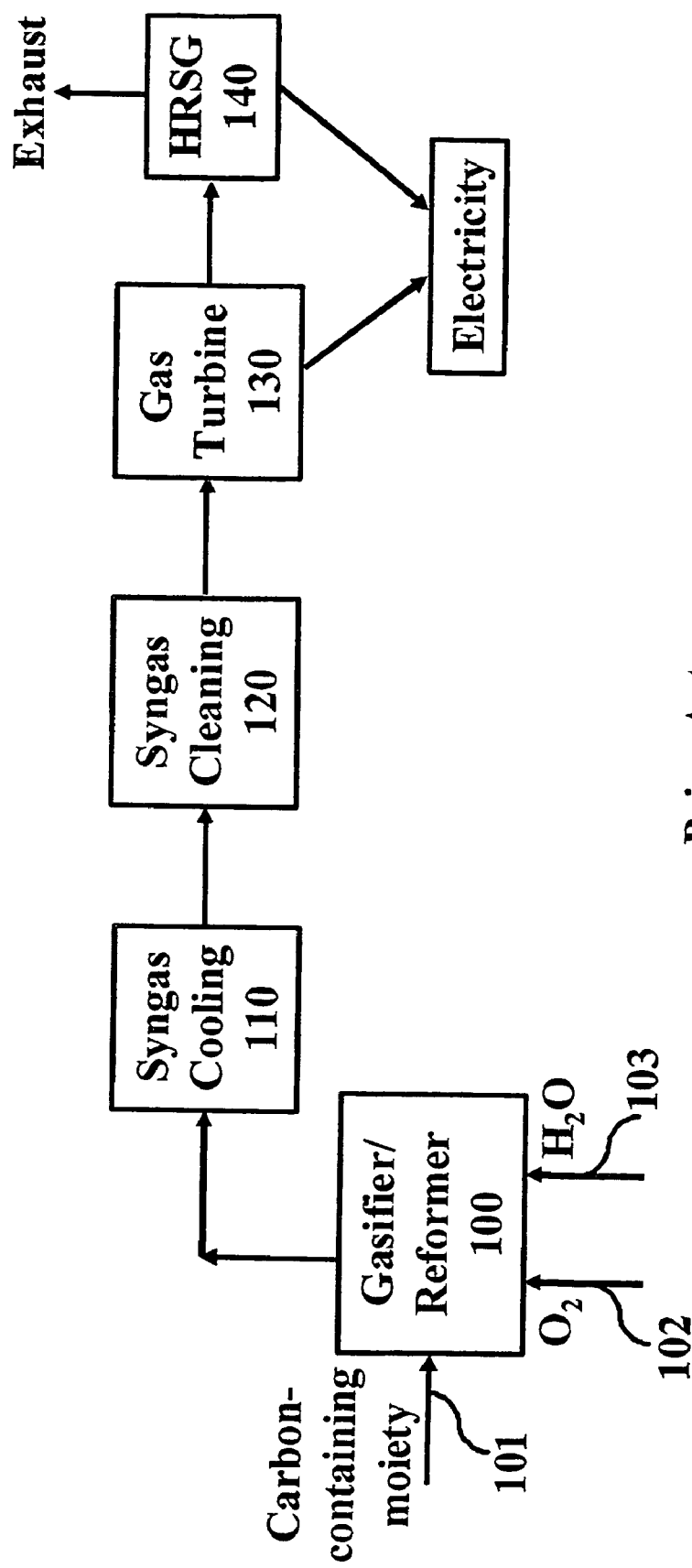
FIG. 1 depicts a schematic representation of an Integrated Gasification Combined Cycle (IGCC) without a $CO_2$ capture for electricity production according to the prior art.

The embodiments of the present teachings described below are not intended to be exhaustive or to limit the teachings to the precise forms disclosed in the following detailed description. Rather, the embodiments are chosen and described so that others skilled in the art may appreciate and understand the principles and practices of the present teachings.

Embodiments of the present invention pertain to the process of hydropyrolysis and more specifically to the process of fast-hydropyrolysis. Fast pyrolysis of biomass to yield bio-oil at a temperature of around 500° C. in an inert atmosphere is obtainable. However, as stated earlier, the bio-oil derived by such a means has undesirable properties in terms of stability, energy density, and use. In one embodiment of the present invention, a process of fast pyrolysis where hydrogen is introduced during the pyrolysis step is referred to as a process of hydropyrolysis.

In this example, hydropyrolysis is performed as fast pyrolysis in the presence of hydrogen. Fast pyrolysis yields large quantities of liquid hydrocarbons which are favored by moderate temperatures (e.g., about 400-600° C.) and short residence time in the pyrolysis reactor (e.g., ~2 seconds). In one embodiment of the present invention, biomass fast hydropyrolysis process has a residence time in the hydropyrolysis reactor of generally less than about 1 minute, and preferably less than about 10 seconds and most preferably of about 2 seconds or less.

The bio-oil produced according to one embodiment of the present invention, is a liquid hydrocarbon mixture containing one or more organic compounds from a group comprising alkanes, alkenes, alcohols, aldehydes, ketones, and/or aromatics etc. A bio-oil liquid hydrocarbon fuel may contain one or more from a group comprising methanol, ethanol, long chain alcohols, alkanes, alkenes, aromatics, aldehydes, ketones, and substitutes aromatic compounds of these. When bio-oil is used as a liquid hydrocarbon fuel, it is generally a material comprising carbon and hydrogen and can exist in a liquid state at normal temperature and pressure (20° C. and 1 atm).

In at least one embodiment of the present invention, details of a process for the synthesis of liquid hydrocarbons by biomass fast-hydropyrolysis whereby $H_2$ for the hydropyrolysis and hydrodeoxygenation processes is supplied using syngas or a $H_2$-enriched stream from gasification/reforming of CCM is provided. In a preferred mode, the heat needed for the hydropyrolysis is also provided by supplying the syngas at an elevated temperature from the CCM gasifier/reformer. For example, the elevated temperature of the syngas will generally be greater than about 200° C., and more preferably it will be greater than about 500° C., and even more preferably, it will be greater than about 700° C. Generally, the temperature of the $H_2$-enriched stream entering the hydropyrolysis unit is chosen to allow the fast heating of the biomass to the desired temperature for fast hydropyrolysis. The fast hydropyrolysis temperature will generally be greater than about 400° C.

In one embodiment of the present invention, at least a portion of the non-condensable gaseous molecules formed during biomass hydropyrolysis and/or the upgradation reaction such as for example hydrodeoxygenation, is combusted to supply heat for the CCM gasification/reforming. It is also possible to burn at least a portion of the char formed in the process to supply heat for CCM gasification/reforming. The additional heat available from the combustion of the non-condensable gaseous molecules and/or char may be used for other processing steps within the plant such as drying of the biomass feed, and/or etc. or even to supplement the heat in the hydropyrolysis reactor.

In one embodiment of the present invention, the biomass material comprises any plant, tree material or a mixture thereof. Some examples include switch grass, poplar tree, sugar cane, corn stover, tree barks, aquatic material including algae, plankton, or any other suitable plant and/or animal from the oceans, estuaries, lakes, rivers, streams, wetlands, and ponds, and/or etc. Examples of liquid hydrocarbons of interest are those that can be used by the transportation sector for cars, trucks, airplanes, and/or etc. These liquid hydrocarbons mixtures which may be used as fuels generally have vapor pressure less than about 1 atm at 20° C.

In one embodiment of the present invention, CCM comprises any carbon-containing material which can be gasified and/or reformed to produce syngas. Examples of such materials include pet coke, methane, natural gas, naphtha, coal, biomass and/or municipal waste, or their combination in any proportion. Natural gas is mostly methane with small quantities of $CO_2$, etc.

One embodiment of the present invention pertains to a scenario where at least a portion of synthesis gas or "syngas" is obtained from the CCM gasifier/reformer and is used for biomass fast hydropyrolysis.

If the CCM is NG, then the NG reformer acts as the CCM gasifier/reformer. In this example, the NG reformer may include a NG-steam reformer, an autothermal reformer as well as a reactor for partial oxidation (POX) of the NG. The syngas contains a mixture of at least carbon monoxide (CO) and hydrogen ($H_2$). The ratio of CO to $H_2$ in the syngas may vary depending on the processing steps used for the NG conversion. Some other components that may also be present in the syngas as it exits the reformer are $H_2O$ and/or $CO_2$. In the NG-steam reformer, steam may be co-fed with NG over a reforming catalyst at a suitably high temperature. The heat for the reaction may be supplied from an external source. In the autothermal reformer, some oxygen is also co-fed along with steam and NG. In the POX reactor, methane and oxygen are reacted resulting in partial oxidation of methane (10). In one embodiment, the NG-steam reforming process provides a higher $H_2$/CO ratio than the process carried out in the POX reactor. A preferred mode that co-produces $H_2$ from methane, which is contained in NG, is via the NG-steam reformer where steam-methane reforming is used. Notably, the $H_2$ containing stream from any of these processes is referred to as "syngas" because this stream will contain some CO. The process of reforming may also include pre-processing steps for removing impurities from the NG, for example.

Another example of CCM is coal. In this scenario, the CCM gasifier/reformer will act as a coal gasifier. Referring to FIG. 1, a gasifier 100 is fed a carbon-containing moiety such as coal 101 along with steam 103 and oxygen 102 (13). Oxygen 102 that is added in the feed reacts with a portion of the coal 101 and this reaction supplies the heat required for the endothermic gasification reaction of coal and preferably satisfies any inefficiencies of the gasifier. Coal gasifiers usually operate at temperatures around 500-1500° C. and at pressures varying from about 1 to 100 bar (13). In a more efficient gasifier, less oxidant is needed and for a given quantity of the coal, the quantity of either $H_2$, CO or both is higher in the stream exiting from the gasifier. That is, the calorific value of the exiting stream is increased as the efficiency of the gasifier is increased. The efficiency of a coal gasifier is currently about 75% but is expected to increase to about 80% or higher in the future because of technical advancements.

In yet another example, the CCM includes biomass that can be used solely as the carbon source or co-fed along with coal, although other CCMs can also be gasified or co-fed in appropriate proportions for gasification.

The gases exiting the gasifier 100 are generally quenched in a cooling unit 110 from relatively very high temperatures to a temperature that is preferably relatively easy to handle in syngas cleaning unit 120. Gases can exit the gasifier 100 at temperatures in the range of about 500° C.-1500° C. After quenching, thermal energy may be recovered from the gas stream. This stream may be subsequently cleaned for particulate material and pollutants such as mercury and sulfur containing compounds in a syngas cleaning unit 120. After cleaning, syngas may be combusted in a gas turbine combustor where electricity is produced from the gas turbine 130. Also, a heat recovery steam generator (HRSG) 140 may be used to generate steam from hot exhaust gas from the gas turbine 130 along with steam generated from syngas cooling 110 which can also be converted to electricity (13). If there is no provision to capture $CO_2$ during this process, then the $CO_2$ generated may be released into the atmosphere.

Figure 2:
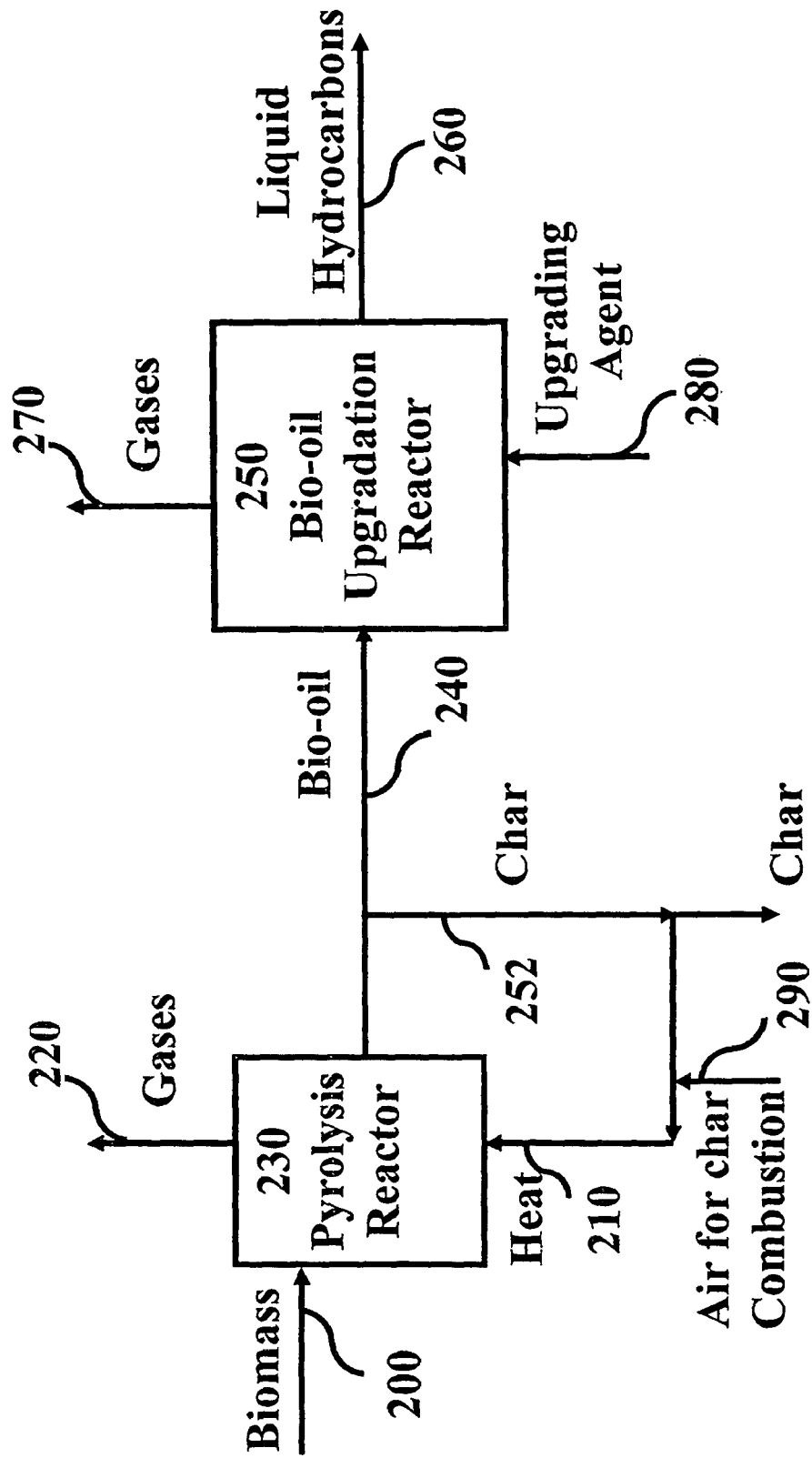
FIG. 2 depicts a schematic representation of a conventional biomass pyrolysis process according to the prior art.

Referring to FIG. 2, a fast pyrolysis reactor 230 is fed biomass 200 and heat is supplied for pyrolysis via mechanism indicated by line 210. The gases 220 exiting the pyrolyzer 230 are generally sent to a cyclone (not shown in FIG. 1) where solid char products 252 may be separated. The char 252 may be burned with air 290 to provided heat for pyrolysis and drying. In one example, bio-oil 240 and gaseous products are separated by cooling to low temperature. Then part of the gases 220 are used to supply heat for pyrolysis or used as fluidizing gas (1). Flue gases from char 252 and gas 220 combustion can also be used for biomass 200 drying. A bio-oil upgradation reactor 250 may be added to the fast pyrolysis process. In this case, a bio-oil stream 240 is then sent to the bio-oil upgrading reactor system 250 either by using, for example, HDO or zeolite upgrading agents 280. Upgraded liquid hydrocarbons are obtained in stream 260 and gases formed during bio-oil upgrading are shown in line 270. In one scenario, about 20-30% of the carbon atoms in the bio-oil 240 escape in a gas phase indicated by line 270 during the bio-oil upgradation, decreasing the overall yield of the liquid fuel (1).

Figure 3:
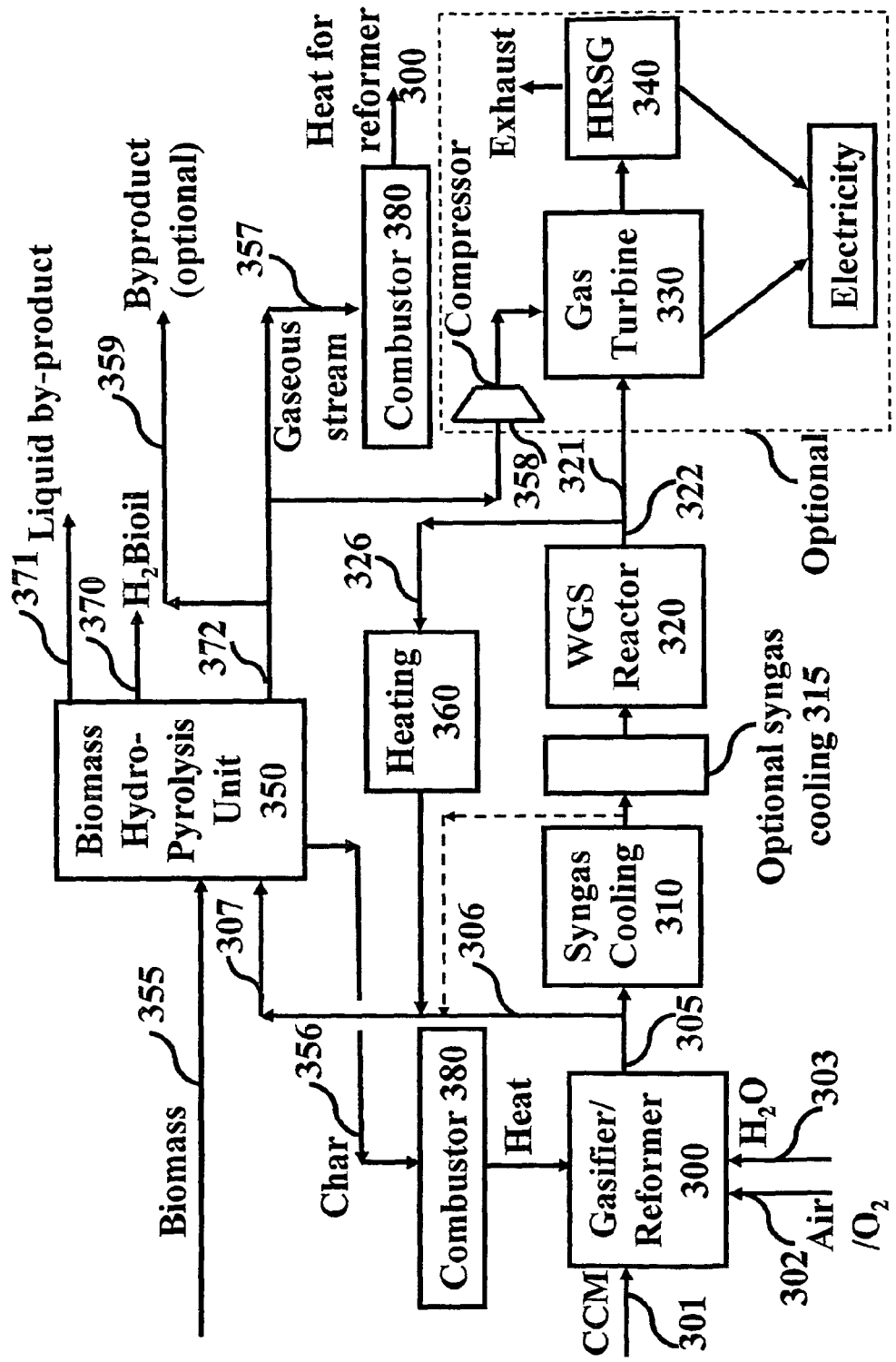
FIG. 3 depicts a generalized schematic representation of an integrated Carbon Containing Moiety (CCM) gasifier/reformer-Biomass fast hydropyrolysis process in accordance with one embodiment of the present invention.

At least one embodiment of the present invention is illustrated in FIG. 3. A CCM stream 301 is fed for steam reforming to unit 300. Preprocessing of the CCM (not shown in FIG. 3) may be included in an operating plant if needed. For example, if the CCM is NG, desulphurization may be appropriate prior to being fed to the reformer unit 300. A steam stream 303 is supplied to the reformer 300. An air or oxygen stream 302 is supplied for combustion. If higher concentrations of CO are desired in the syngas stream 305, then some $CO_2$ can also be used as a reforming agent and co-fed with the CCM 301. Stream 306 containing syngas is sent to a biomass fast hydropyrolysis reactor 350. The output from the CCM gasifier/reformer 300 may be in the form of a hot gas (T>about 800° C.) containing nearly equilibrium mixtures of $H_2$, CO, $CO_2$ and $H_2O$. In a preferred embodiment, the hot output gas 305 from the CCM gasifier/reformer 300 is directly used without further processing for fast hydropyrolysis. This is also preferred if either a NG autothermal reformer or a POX reactor is used. The temperature of the hot output gas from the CCM gasifier/reformer tube may also be adjusted to yield a specific or desired temperature for fast hydropyrolysis of the biomass. For example, if the temperature of the hot output gas is higher than a particular target temperature, then, its temperature may be adjusted to a lower temperature by raising or increasing the amount steam 303. The pressure of this stream in one embodiment is typically in the range of about 30 bar to 100 bar. In a preferred embodiment of the present invention, the syngas stream 306 is used for hydropyrolysis at a pressure higher than about ambient pressure and generally close to about the pressure exiting reformer 300. From the reformer 300, at least a portion of the syngas is utilized for biomass fast hydropyrolysis. If desired, a portion of syngas from the CCM gasifier/reformer 300 may be sent through a water-gas shift reactor to increase the $H_2$ concentration in the stream. Preferably, no separation of $H_2$ from the syngas occurs prior to the introduction of stream 306 to the hydropyrolysis reactor 305 and thus, a gas containing CO, $CO_2$, $H_2$, $H_2O$ etc. is directly fed to the hydropyrolysis reactor 305.

In one embodiment of the present invention, during fast hydropyrolysis of biomass that is fed via stream 355, the syngas stream 306 provides the $H_2$ used for the HDO removing oxygen as water and improving the energy content of the bio-oil significantly. It is also believed that in certain fast hydropyrolysis processes, the presence of CO in the syngas will also facilitate deoxygenation of organic molecules by converting them to $CO_2$. That is, the $H_2$ and CO containing syngas removes oxygen from the organic molecules. Specifically, in the deoxygenation step, either $H_2$ alone or both $H_2$ and CO together can directly or indirectly participate. Accordingly, the deoxygenation step in presence of $H_2$ and CO containing syngas is referred to as hydrodeoxygenation (HDO). Any suitable catalyst known to those skilled in the art may also be used to enhance the deoxygenation step. Hot syngas (T>about 500° C. and preferably T>about 700° C.) can supply the entire or a part of the process heat for the fast hydropyrolysis process. $H_2$ present at these conditions can also lead to some hydrogasification forming light hydrocarbon molecule. Notably, both HDO and hydrogasification reactions are exothermic. The combination of the exothermic hydrodeoxygenation and hydrogasification reactions and the hot syngas may be used to supply all of the thermal energy used for the hydropyrolysis process, significantly improving the process energy efficiency of this embodiment. Under these conditions, char formation may be reduced due to the hydrogasification reaction. Any char formed during the biomass hydropyrolysis process can be combusted in combustor 380 via stream 356 to supply heat for the CCM gasifier/reformer and/or biomass hydropyrolysis unit. Alternatively, char may be collected as by-product and used for some other purpose.

Gases formed during the biomass hydropyrolysis process as well as unreacted syngas fed for the process may be collected in line 372 and sent via line 357 to the combustor 380 to supply heat for the NG reformer and/or biomass fast hydropyrolysis process. In a preferred mode, at least a portion of the gaseous stream 357 is combusted to supply heat for NG-steam reforming. Alternatively, at least a portion of the stream 372 can be sent to a gas turbine 330 and/or HRSG 340 for power generation or a portion of this stream may be collected as byproduct in line 359. In a most preferred embodiment, a major portion of the stream 372 can be fed to the CCM gasifier/reformer 300 as reactant. Compressor 358 may be used to increase the pressure of a portion of the gaseous stream 357 heading to the gas turbine to a suitable value. Bio-oil formed during the fast-hydropyrolysis process is collected in line 370. Also, a liquid by-product stream, which may be enriched in water, can be collected in line 371. In one embodiment, if the bio-oil yield is to be increased, then formation of light gases in the hydropyrolysis unit through hydrogasification reactions are reduced, minimized or eliminated.

Applicants have named the process of the embodiment of the current invention as described in the foregoing paragraphs as '$H_2$Bioil-NG', when CCM is NG. Moreover, the nomenclature: $H_2$Bioil-B refers to a process where $H_2$, which is derived from biomass gasification, is used rather than the NG reforming process; $H_2$Bioil-C when coal is used as CCM; $H_2$CAR-NG refers to $H_2$CAR process of Agrawal et al. (14) when $H_2$ is derived from NG; $H_2$Bioil and $H_2$CAR refers to hydrogen from carbon-free energy sources. $H_2$Bioil is a fast hydropyrolysis process in presence of $H_2$, which is derived from carbon-free energy sources and is described in detail by Agrawal et al. (15).

Notably, in a preferred embodiment of the present invention, the slip stream in line 306 is not sent through a separation unit to recover pure hydrogen for the biomass fast hydropyrolysis unit. Instead, the stream is directly sent to the biomass hydropyrolysis unit 350 without any further separation. This means that no significant amount of CO, $CO_2$ and $H_2$ are separated from each other from the syngas stream 305 either before collecting the slip stream or from the slip stream after it has been collected prior to feeding it to the biomass hydropyrolysis unit 350. The ability to 'directly' use a portion or all of the hot syngas in line 305 for biomass hydropyrolysis unit 350 is a preferred embodiment.

In one embodiment of the present invention, fast hydropyrolysis may be done in the presence of a suitable HDO catalyst. For this purpose, if heat for hydropyrolysis is provided through a fluidized bed, then catalyst particles may either be mixed with the material of the fluidized bed or supported within and/or on the particles being fluidized. For example, sand may be used as a circulating fluidized material to supply heat for fast hydropyrolysis. In such a case, the HDO catalyst may either be mixed with the sand or supported on the sand particles. Similarly, WGS catalysts can also be mixed with the sand or supported on the sand particles during biomass fast hydropyrolysis. When the exhaust of the hydropyrolysis reactor contains solids, the exhaust may be sent through a cyclone to separate the solids. If the hydropyrolysis is effective by itself to provide a bio-oil with lower oxygen content and higher energy density, then the separated exhaust may be rapidly quenched to condense bio-oil. In one embodiment, the energy density of the bio-oil is greater than about 20 MJ/kg, and is preferably greater than about 30 MJ/kg and is most preferably greater than about 35 MJ/kg. The higher density bio-oil may be usable in an internal combustion engine with minimal processing.

If the separated hot gaseous stream from the exhaust of the hydropyrolysis reactor 350 contains bio-oil whose energy density can be further increased, then this gas stream is sent to a HDO reactor containing suitable HDO catalyst. The temperature of the separated hot gaseous stream may be adjusted accordingly for the HDO reactor. Generally, as stated earlier, this may include some cooling prior to feeding the gas stream to the HDO reactor.

The hydropyrolysis and HDO reactors may be any suitable reactor configurations, such as for example, fluidized or entrained bed, etc. The HDO catalysts used in the HDO reactor can be chosen from an array of known HDO catalysts, such as for example, FeS, Ni—Co and/or Co—Mo on $\gamma$-$Al_2O_3$, and/or a newly developed catalyst.

In addition, if coal is the CCM, then additional biomass can be co-fed to the CCM gasifier/reformer unit 300 to make up for any power production losses due to utilization of $H_2$ and process heat during the biomass hydropyrolysis process. This additional co-feeding of biomass preferably ensures that any electricity production from the power plant remains constant.

Coal gasifiers have efficiency of about ~75% (LHV) and thus, about 75% of the chemical energy in coal is correspondingly stored as CO and $H_2$. However, cold gas efficiency is around 95% (10). The difference in these efficiencies may show up as heat and this heat can be soaked up during biomass pyrolysis. This is one example of a very efficient utilization of heat available from the gasifier exhaust. Currently, however, this heat is used to generate power and (Prins et al.) that major energy losses in biomass gasification and subsequent conversion to liquid fuel are in gasification (about 23% loss), steam generation (about 9% loss), and power generation (about 24% loss) (16). Direct use of heat generated during the gasification process for the pyrolysis process preferably removes and/or reduces inefficiencies involved with steam generation and its subsequent use for power production. This synergistic integration can lead to significantly higher energy efficiency for the biomass hydropyrolysis. Without being tied to any particular theory, it is believed that this is why exhaust syngas from the coal gasifier (or CCM gasifier/reformer) feed to the biomass hydropyrolysis unit is beneficial.

In an alternate embodiment, either a portion or all of the syngas in line 305 may be subjected to water-gas shift (WGS) reaction (unit 320) to adjust its $H_2$/CO ratio prior to being fed to the fast hydropyrolysis unit 350:

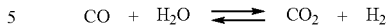

$$CO + H_2O \rightleftharpoons CO_2 + H_2$$

Specifically, this reaction, which occurs in the WGS reactor 320, increases the $H_2$ content of the gaseous stream 322 exiting the WGS reactor 320 and a part of this gas in stream 326 can be used for hydropyrolysis and if needed, the rest of the gas in line 321 can be sent to the gas turbine 330 for power generation if desired. Generally, the WGS reaction is conducted at moderate temperatures. Therefore, the syngas in line 305 may be first cooled in a syngas cooling unit 310. If desired, the exhaust from the syngas cooling unit 310 may be further cooled in an optional syngas cooling unit 315 to further adjust the final temperature of the stream entering the WGS reactor 320. In one embodiment, all of stream 322 will be sent to the biomass fast hydropyrolysis unit. For this purpose, stream 326, which is derived from line 322, may be sent through a heating unit 360 to adjust its temperature. When only a portion of the stream 305 is sent through a WGS reactor, then stream 326 may be directly blended with a hot stream 306 without the use of the heating unit 360.

In yet another embodiment, after processing via the WGS reactor 320, a pressure swing adsorption (PSA) or any other suitable separation process may be used to obtain an enriched $H_2$ stream. The enriched $H_2$ stream can be utilized for the fast hydropyrolysis process 350 and rest of any non-condensable gases can be either sent for combustion via a combustor 380 to supply heat for reforming or to the gas turbine 330 for electricity generation.

In one aspect of the present invention, the temperature of the stream 306 and/or 326 is able to be adjusted prior to feeding it to the biomass hydropyrolysis unit 350. In this scenario, if the syngas stream in line 306 is collected from syngas stream 305, then it may be cooled and its temperature adjusted accordingly for hydropyrolysis in the hydropyrolysis unit 350. The preferred temperature of the stream being fed to the hydropyrolysis unit via stream 307 will be dependent on its mass flow-rate relative to the mass flow rate of the biomass. If the reformer exhaust, e.g. syngas 305, is too hot then it may be either cooled in the syngas cooling unit 310 to supply the stream for line 307 or a portion of the cooled stream from the exhaust of syngas cooling unit 310 may be blended with stream 306 to supply the stream 307 at the desired temperature.

Figure 4:
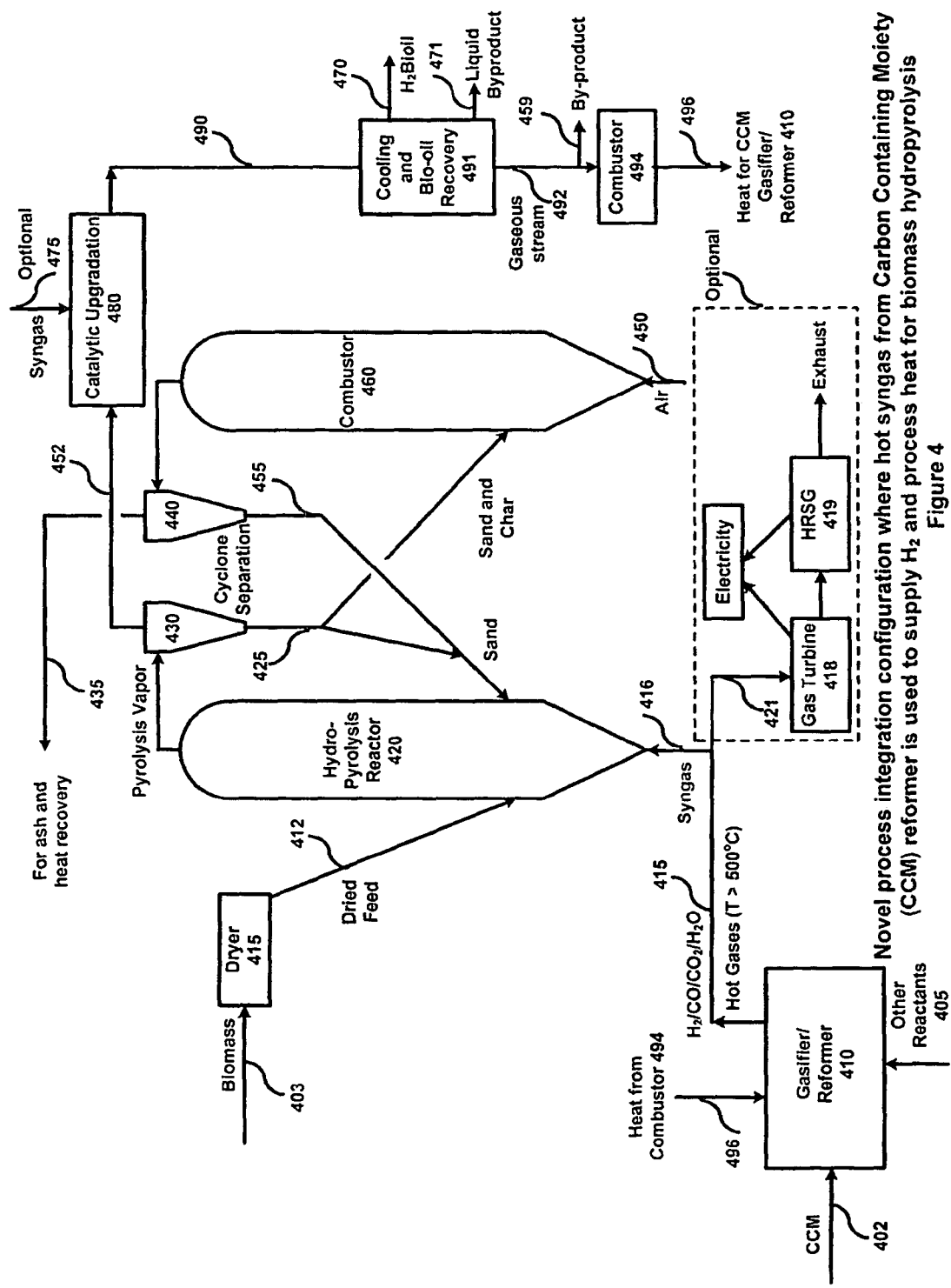
FIG. 4 depicts a novel process integration configuration where hot syngas from Carbon Containing Moiety (CCM) gasifier/reformer is used to supply $H_2$ and process heat for biomass fast-hydropyrolysis in accordance with one embodiment of the present invention.

In yet another embodiment of the present invention, fast hydropyrolysis may be done in the presence of a suitable HDO catalyst as depicted in FIG. 4. Accordingly, heat for hydropyrolysis may be provided through a fluidized bed as shown for the hydropyrolysis reactor 420, and catalyst particles could either be mixed with the material of the fluidized bed or supported on the particles being fluidized. If the exhaust of the hydropyrolysis reactor (denoted as pyrolysis vapors) contains solids, it may be sent through a cyclone separator 430 to separate the solids (e.g. char and sand) 425. These solids may be sent to a fluidized bed combustor 460 where any char produced during the biomass hydropyrolysis process may be combusted in presence of air in stream 450, which acts as an oxidizing agent. The heat generated in the combustion process heats the sand to a relatively high temperature which is further separated from ash in a second cyclone 440 to feed streams 435 and 455. Stream 455 carries the hot sand to the biomass fast hydropyrolysis reactor 420 where it supplies heat for hydropyrolysis. In one embodiment, the hydropyrolysis is effective by itself to provide the bio-oil with stability and/or a high energy density, and the separated exhaust stream 452 may be rapidly quenched to condense the bio-oil.

In another embodiment, the separated hot gaseous stream 452 from the exhaust of the hydropyrolysis reactor 420 contains bio-oil whose energy density may be further increased and/or oxygen content may be further reduced, by sending a major portion (e.g. greater than about 50%) of this gas stream to a catalytic upgradation reactor 480, which contains a suitable HDO catalyst. 'HDO reactor' may also be used interchangeably to describe catalytic upgradation. Prior to sending the hot gaseous stream from the hydropyrolysis reactor 420 to the HDO reactor 480, char formed during biomass fast hydropyrolysis can be separated. The temperature of the separated hot gaseous stream 452 may be adjusted to a desired target temperature for the HDO reactor unit 480. If desired, additional hot syngas as stream 475 from the NG reformer 410 may be co-fed to the HDO reactor. The effluent 490 from the HDO reactor is then condensed in a cooling and bio-oil recovery unit 491 to preferably obtain low-oxygen, high energy density bio-oil product 470 in accordance with the present invention. Another liquid stream enriched in water may also be separately collected in line 471. Advantageously, the low-oxygen, high energy density bio-oil may be directly used in many applications without further upgradation. In one embodiment, the biomass pyrolysis unit 350 shown in FIG. 3 includes hydropyrolysis reactor 420 and hydrodeoxygenation reactor 480 as described here in FIG. 4. Moreover, the reformer 410, the CCM 402, the reactants 405, the combustor 494, the syngas 415 and 416, Biomass 403 and the HRSG 419 shown in FIG. 4 may correspondingly function as the reformer 300, the CCM 301, the reactants 302 and 303, the combustor 380, the syngas 305 and 306, Biomass 355 and the HRSG 340 as shown in FIG. 3. Notably, the Biomass 403 may be pre-dried via a dryer 415 before being feed to the reactor 420 via line 412.

The HDO in unit 480 may be at temperatures of less than 500° C., more preferably less than 400° C. and most preferably near or below 350° C. If a power generation system is used, a portion of the uncondensed gaseous stream 492 from unit 491 may be sent to a gas turbine 418 for power generation. If needed, a portion of the gaseous stream 492 can be recovered as a byproduct stream.

Figure 5:
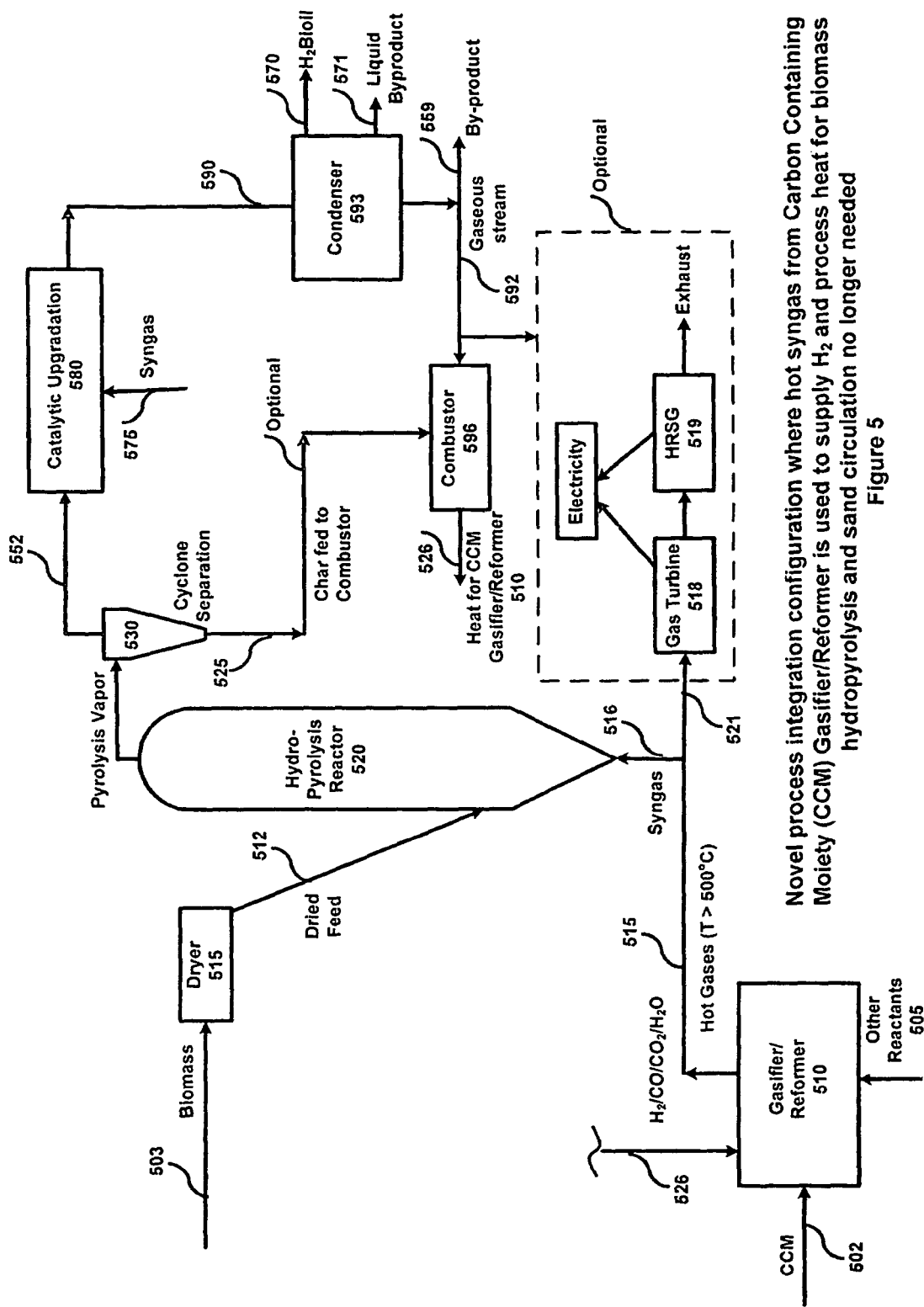
FIG. 5 is the novel process integration configuration depicted in FIG. 4 but where sand circulation is no longer used in accordance with one embodiment of the present invention.

Another embodiment according to the present invention is shown in FIG. 5. The common units and streams of FIG. 5 with those of FIG. 4 have the same last two digits. So for example, the reformer 510 of FIG. 5 corresponds to the reformer 410 of FIG. 4. Preferably, this embodiment decreases the capital and operating cost of biomass fast hydropyrolysis process by utilizing the entire process heat from hot syngas and accordingly, no sand recirculation may be needed for the process. Advantageously, this configuration may involve a relatively lower capital and operating cost for liquid fuel production which may have desirable properties so that it can be used directly by the transportation sector. Furthermore, the embodiment may have a very high energy efficiency for conversion of biomass to liquid fuel and may eliminate product loss. Non-condensable gases can be used to generate heat for the CCM gasifier/reformer 510. However, if needed, all or a portion of the char may be taken as by-product. Similarly, a portion of the gaseous stream may be recovered as a byproduct stream.

$H_2$ present in the syngas may be utilized in the hydropyrolysis reactor and the gases such as $CH_4$ preferably remain mostly unaffected. There is also a finite possibility that CO can remove oxygen form the bio-oil and form $CO_2$. In addition, 10-15 wt % of biomass may be converted to non-condensable gases during hydropyrolysis. Non-condensable gases in line 592 can be collected after the condenser 593. In a preferred embodiment, these non-condensable gases that are formed during hydropyrolysis as well as from unreacted syngas are then sent to the combustor 596 and the heat generated is sent via line 526 and used for CCM gasification/reforming via the reformer 510.

In one embodiment, at least a portion of the non-condensable gases are not used in the combustor 596 but are collected as a by-product stream in lines 359, or 459 or 559 and used internally in the plant. This portion of the gases may be directly recycled to the hydropyrolysis unit. This preferably allows the use of unreacted CO and $H_2$. It may also provide a means to regulate the temperature of the syngas stream entering the biomass fast hydropyrolysis reactor 520. In yet another embodiment, this portion of the gas stream (from streams 359, 459 or 559) may be directly sent to the gasifier/reformer unit 510 along with the CCM feed 502. This way any methane and/or other hydrocarbons present in the stream will be converted to provide additional $H_2$ and CO for hydropyrolysis. If desired, prior to feeding the gas to the reformer, the gas may be sent through a separation unit to remove/recover any of the components present in the stream. For example, C2 through C4 may be recovered from the stream as by-products. Also, $CO_2$ may be separated from the stream.

Figure 6:
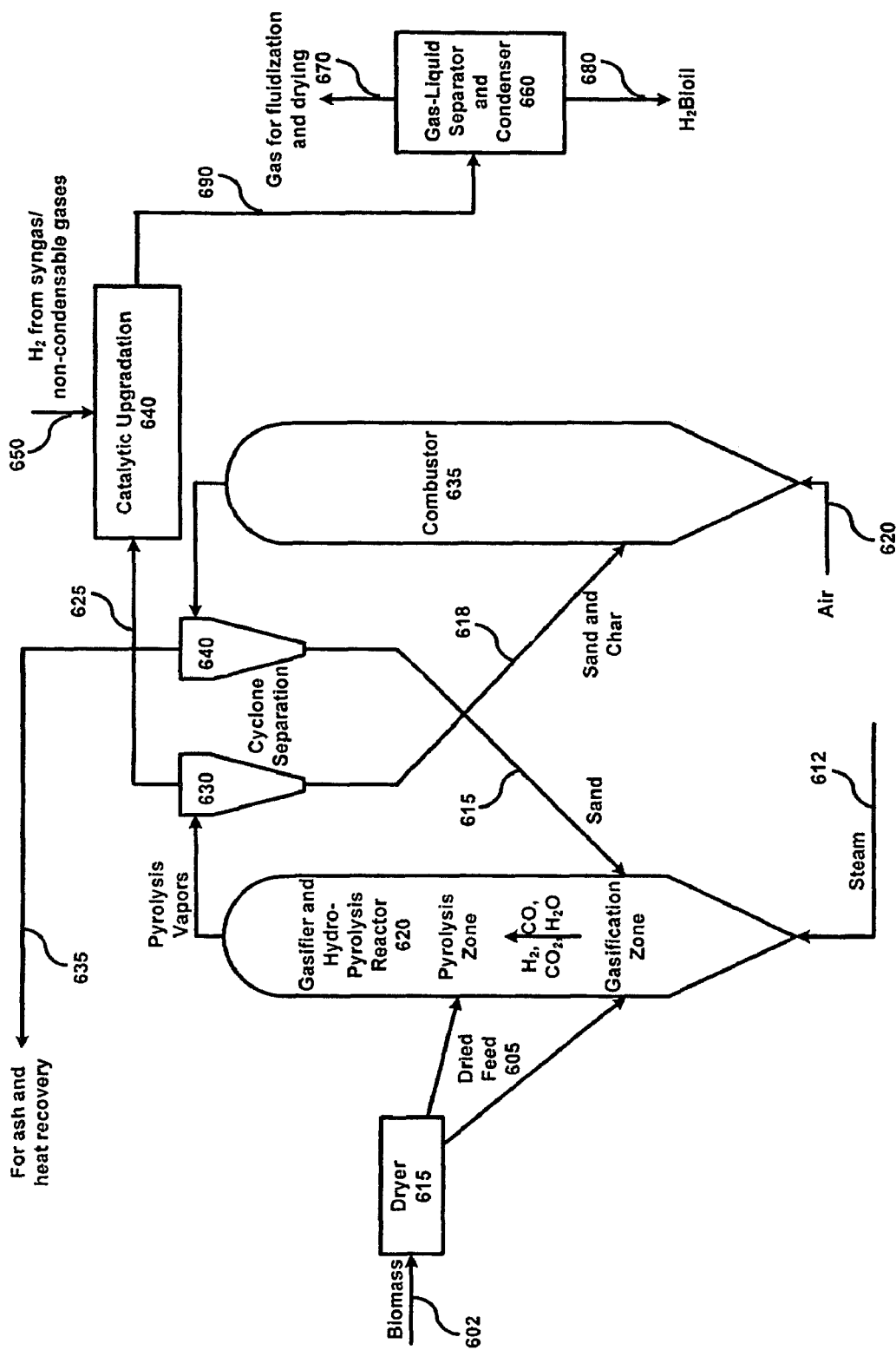
FIG. 6 depicts a novel reactor configuration for simultaneous gasification and hydropyrolysis in a single reactor to supply in-situ $H_2$ from syngas and process heat for biomass hydropyrolysis in accordance with one embodiment of the present invention.

Referring to FIG. 6, at least one embodiment in accordance with the present invention is provided. FIG. 6 illustrates a novel reactor configuration for simultaneous gasification and pyrolysis in a single reactor. This embodiment depicts the situation when biomass 602 is used as the CCM. The integrated design strives to achieve both the gasification and fast-hydropyrolysis functions in the same vessel 620 and supplies in-situ $H_2$ and process heat from hot syngas. The advantage may be relatively low-cost compact equipment for an efficient $H_2$Bioil-B process. This can be thought of as a highly efficient version of the process wherein no $H_2$ and CO are combusted in the power plant for electricity generation. Instead the high value of $H_2$ and CO may be realized and only a fraction of biomass may be gasified which is sufficient for the process hydrogen and heat requirements for the subsequent biomass fast-hydropyrolysis process.

Figure 7:
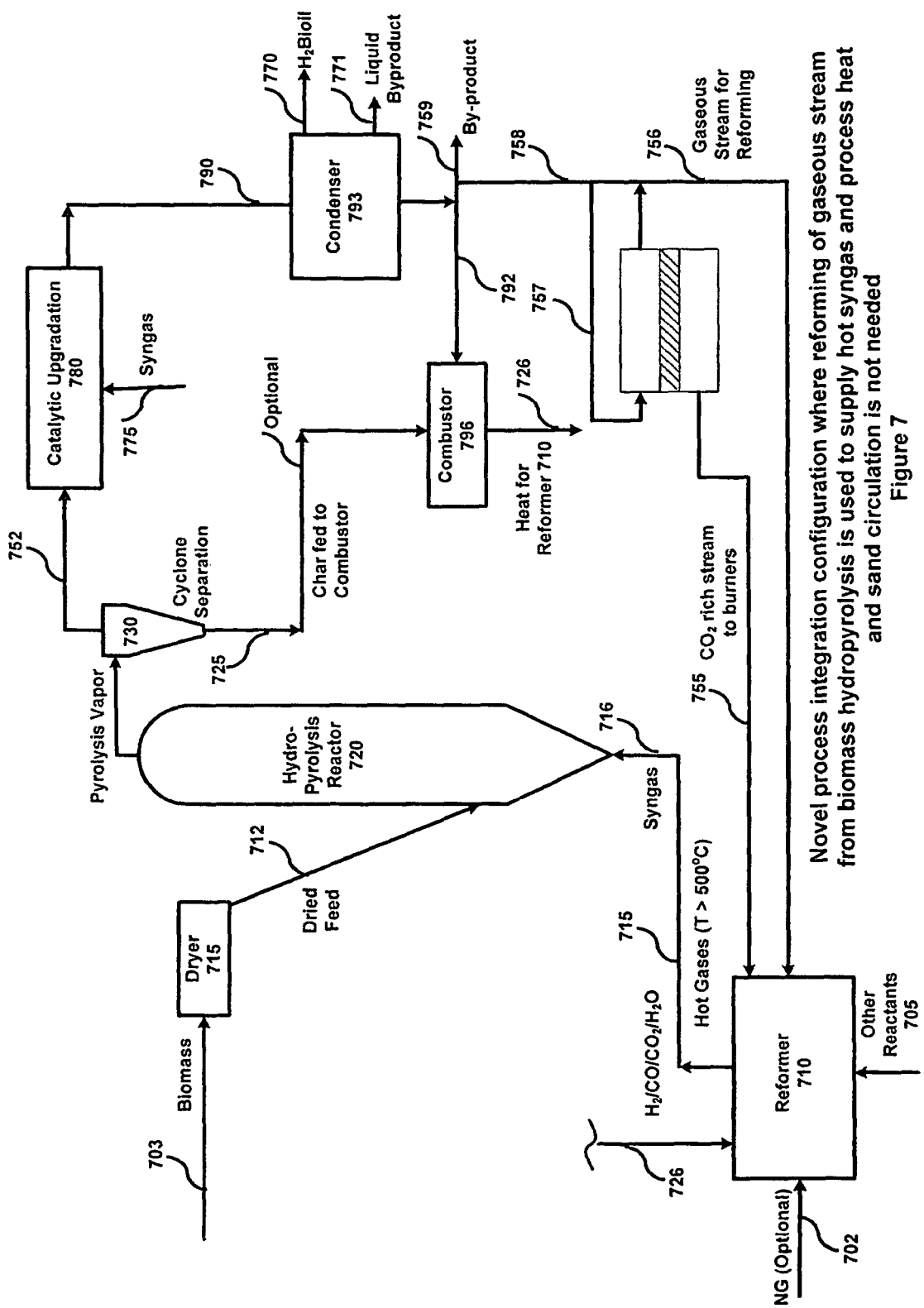
FIG. 7 depicts a novel process integration configuration where reforming of gaseous stream from biomass hydropyrolysis is used to supply hot syngas and process heat and sand circulation may not be used in accordance with one embodiment of the present invention.

In yet another embodiment in accordance with the present invention and as illustrated in FIG. 7, no CCM is gasified and all the syngas needed for biomass fast-hydropyrolysis, via lines 715 and 716, is obtained from the gaseous stream reforming which is produced during the biomass fast-hydropyrolysis and HDO processes. This process will be suitable for situations when large quantities of gaseous products containing methane are formed during the biomass fast-hydropyrolysis in unit 720 and HDO in unit 780. The basic process description still remains the same except that no additional CCM gasification/reforming is needed for the process. The gaseous stream 758 can be separated into a $CO_2$-rich stream 755 and $CO_2$-deficient stream 756. The $CO_2$-rich stream 755 can be sent to the reformer burners of the reformer 710 for heating and the $CO_2$-deficient stream 756 can be sent for reforming in the reformer 710. Optionally, small quantities of NG 720 can be fed to the reformer 710 to provide additional syngas, if desired. This configuration may be especially attractive as preferably all of the by-products are consumed during the process and no power generation equipments such as gas turbine and HRSG are needed in the preferred mode. However, they may be used in the process if desired.

Figure 8:
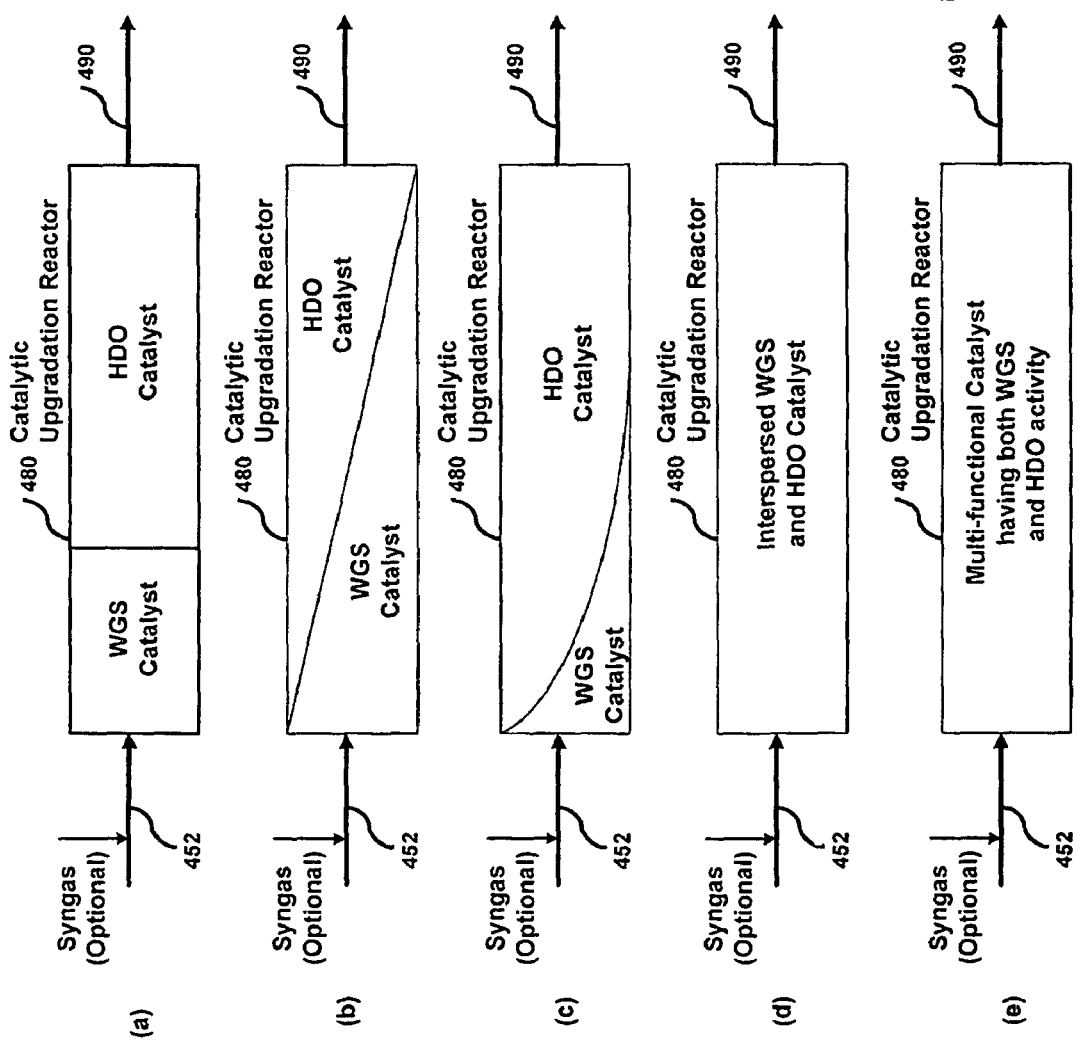
FIG. 8 depicts different WGS and HDO catalysts combination that can be used in the Catalytic Upgradation reactors in accordance with one embodiment of the present invention.

In one embodiment of the present invention, the catalytic upgradation reactor 480, 580, 640, and 780 in FIGS. 4, 5, 6 and 7 can have different profiles of WGS and HDO catalysts in the catalytic upgradation reactor 480 as shown in FIGS. 8 (a), (b) and (c). Yet in another embodiment of the present invention, the WGS and HDO catalyst are interspersed throughout the reactor 480 as shown in FIG. 8 (d). In one another embodiment, a multi-functional catalysts having both WGS and HDO activity can be used in the reactor 480 as shown in FIG. 8 (e). It should be noted that numbering notations from FIG. 4 are used in FIG. 8. These different WGS and HDO catalyst profiles in the catalytic upgradation reactor preferably facilitate adjusting the $H_2$:CO ratios to suitable levels for the oxygen-removal HDO reaction.

In another embodiment, the low-oxygen, high energy density bio-oil may be shipped to a central refinery for further processing to form a specific liquid fuel for the transportation sector as is typical with a petroleum crude feed in a refinery. The bio-oil could also be shipped to a chemical plant to make specific chemicals. In these scenarios and others, the present invention may advantageously provide a higher energy density bio-oil which facilitates shipping more energy in a given volume and that reduces the cost of shipping. Furthermore, this low-oxygen and high energy density bio-oil may be relatively more stable during shipping. Moreover, shipping to a central refinery may be done from multiple plants in accordance with the present invention. Thus, a synergistic and economical solution solving the shipment of low-density biomass over long distance may be provided by conversion of biomass to high energy density bio-oil through our distributed plants operating in accordance with at least one embodiment of the present invention.

In another embodiment, carbon-containing municipal waste and some biomass can also be co-fed to a properly designed CCM gasifier/reformer. Thus, organic waste materials from various sources can be converted to useful liquid hydrocarbons. This may help with both the handling of waste material and in carbon management of the environment. Also, other coal derived or coal like materials such as peat, lignite, pet coke, sub-bituminous, bituminous, anthracite and etc. can also be co-fed to the gasifier. Other carbon sources such as methane, naphtha can also be co-fed along with the biomass.

In yet another embodiment of the present invention, instead of co-feeding pet coke, methane, naphtha, biomass or municipal waste, these carbon-moieties or their combination in any proportion can be solely used instead of gasification of coal.

Yet another aspect of this system of integrated CCM gasifier/reformer-biomass hydropyrolysis is that the majority of the biomass is processed via hydropyrolysis which is preferably more efficient. This integration may be better than the biomass gasification followed by a FT process because not all the biomass has to be converted to syngas which is then converted to liquid fuel via FT process. The FT reactor itself may lose around 27% of the energy stored in the syngas during the conversion process. Instead only a fraction of total biomass which is required to keep the total power generation from an IGCC plant nearly constant is gasified and the rest may be processed via hydropyrolysis.

In at least one embodiment of the present invention, a high efficiency pathway to synthesize liquid hydrocarbon fuel from biomass is provided. Current conversion route of gasification to syngas followed by a $H_2$—CO (syngas) to liquid conversion reaction has inefficiency due to large energy losses during gasification (16) and highly exothermic heat of reaction of syngas conversion to liquid fuel (14). This co-production of thermal energy decreases significantly the energy efficiency of these processes. The integrated CCM gasification/reforming-biomass fast hydropyrolysis process of the present invention may be much better than gasification followed by FT process. Illustrated below is an example of the synergies when NG is used as the CCM. However, similar results are achievable for other CCM materials.

ILLUSTRATIVE EXAMPLE

1. The quantity of liquid fuel produced from a given quantity of NG and Biomass via the process of the current invention is 1.6 times higher than the combined GTL and the BTL processes.
2. Process thermal efficiency of a process in accordance with an embodiment of the present invention is higher than the GTL or the BTL stand-alone processes.
3. The non-condensable gases formed during biomass hydropyrolysis process can be utilized in the combustor to generate heat for the NG reformer. If desired, by-product char may also be used for this purpose.
4. Low capital and operating cost plant for liquid fuel production via biomass fast hydropyrolysis process because it may be possible to operate without a separate mechanism such as sand recirculation for heat transfer to biomass hydropyrolysis reactor and low capital investment required for the reforming and pyrolysis reactor. This may lead to small size distributed plants.
5. Direct utilization of hot syngas from the NG reformer for biomass fast hydropyrolysis supplying $H_2$ for the HDO reaction and process heat for the hydropyrolysis. This eliminates the need to separate $H_2$ from the reformer exhaust gas and may save cost. Also, direct use of heat contained in the gas stream exiting the reformer for fast hydropyrolysis may improve thermal efficiency and reduce cost. For certain operating modes, an embodiment of the present invention may eliminate the need to generate heat separately for the fast hydropyrolysis reactor as all the heat for this reactor may be supplied by the hot syngas entering the reactor. This may further lead to the reduction of cost and contribute to the compactness of the equipment.

Further aspects of the present invention can be realized by examples of energy efficiency comparisons of the biomass gasification followed by the FT process and biomass hydropyrolysis using syngas from the exhaust of the coal gasifier. Initially, the example is for the scenario when coal is the CCM and later examples are for the situation when NG is used as CCM.

Example 1

Example 1.1

Energy Efficiency of the Biomass Gasification Followed by FT Process

Calculations for the Conventional process with gasifier at 74% efficiency (LHV) is provided. Data is obtained from a H2A biomass central gasification plant. From the H2A data, 83334 kg of dry biomass/hr produces 9708.7 kmol/hr of syngas. From ASPEN simulation, for the conventional FT process, 67.89 kmol/hr of diesel is produced from this amount of syngas. In ASPEN simulation, conversion per pass from the hydrocarbon conversion FT reactor on the basis of CO fed to the reactor was taken to be 100%. A WGS reactor is used prior to the hydrocarbon conversion FT reactor to obtain a $H_2$/CO ratio of 2. The effluent stream from the simulated gasifier was taken to be at thermodynamic equilibrium (17, 18).

1. Energy content of biomass = $83334 \frac{kg}{hr} \times 19.83 \frac{MJ}{kg}$ $= 1652600 \frac{MJ}{hr}$.

2. Amount of diesel produced from ASPEN model=67.89 kmol/hr.

Energy content in diesel $\frac{67.89 \text{ kmol}}{h} \times \frac{212.42 \text{ kg}}{1 \text{ kmol}} \times \frac{44 \text{ }MJ}{kg} = 634530 \frac{MJ}{hr}$ 3. Carbon efficiency = $\frac{67.89 \times 212.42 \times 0.85}{83334 \frac{kg}{hr} \times 0.5088} = 28.9\%$ 4. Overall energy efficiency of the process $\frac{634530}{1652600} \times 100 = 38.4\%$ Example 1.2

Energy Efficiency of Biomass Hydropyrolysis Process Using Slip Stream of Syngas from the Exhaust of the Coal Gasifier For this analysis, data for pyrolysis is obtained from NREL's simulation (19), coal gasification is based on CONOCOPHILIPS E-Gas™ gasifier at Wabash River coal gasification repowering project available in a recent DOE/NETL publication (13).

Mass and Energy Balance for NREL Pyrolysis Simulation

In the pyrolysis process, 20789.6 kg/h of bone dry biomass is fed to the pyrolysis reactor. Pyrolysis reactor is operated in bubbling fluidized mode where ratio of fluidizing gas to dry biomass is 2.75. So, 57171 kg/hr of gas stream is required as fluidization gas. Yields from pyrolysis reactor on dry basis is oil=59.9%, water=10.8%, char and ash=16.2% and gas=13.1%. Thus, 12453 kg/hr bio-oil is obtained.

Biomass feed=20789.6 kg/hr (bone dry)

Bio-crude produced=16091 kg/hr (23.6% moisture content)

Moisture=3797.5 kg/hr

Energy for the process is provided by combustion of char and gases. Excess power is converted to electricity. So, in the process, no char or gases are left. The pyrolysis reactor is modeled as an adiabatic reactor feed for which heat is supplied at 500° C. Recycled gas is fed at a ratio of 2.75:1 with respect to biomass on weight basis. Recycled gas is heated to 700° C. before mixing it with dried biomass to raise its temperature to 454° C. Finally, the temperature is raised to 500° C. for pyrolysis and fed in the pyrolysis reactor which operates adiabatically. Net electricity output from facility after accounting for recycle gas compression and feedstock size reduction = 588 kW = $588 \frac{kJ}{s} = 2117 \frac{MJ}{hr}$ Bio-crude and Biomass both have energy content of 17 MJ/kg (LHV).

Energy efficiency = $\frac{16091 \times 17 + 2117}{20789.6 \times 17} \times 100 = 78\%$ Without accounting for power production, energy efficiency=77.4%. On the other hand, if efficiency of heat to electricity conversion is arbitrarily at 40% then 5292 MJ/hr of thermal energy is used for electricity generation and total thermal efficiency of the process would be 78.9%. However, as against diesel produced by biomass gasification followed by FT reaction, this bio-oil has a low energy content of 17 MJ/kg and can not be used for transportation. Furthermore, as described earlier, it has handling problems.

Energy Efficiency of the Integrated Coal Gasification-Hydropyrolysis Process

Energy efficiency of the coal conversion to electricity based on the data available for CONOCOPHILIPS E-Gas™ gasifier at Wabash river is 40.6% (LHV) (13). Coal utilization for this plant is 5050 tonnes/day and power production is 623 MWe (13).

The composition of the bio-oil that is obtained is C=59.27 wt %, H=6.03 wt %, O=34.69 wt %. Removal of oxygen (O) in the bio-oil to 4 wt % implies that 3821.8 kg/hr of O out of 4319.9 kg/hr O needs to be removed. For hydrodeoxygenation reaction, it is clear that one O atom removal requires 2 Hydrogen molecules. So, we need a supply of 955.45 kg/hr $H_2$ to carry out the HDO reaction. Therefore, from a total of 12453 kg/hr crude bio-oil, a loss of 3821.8 kg/hr is due to a loss of oxygen as $H_2O$ and gain of 477.7 kg/hr is due to the additional hydrogen atoms. This leads to 9108.9 kg/hr of hydrodeoxygenated bio-oil from the process in accordance with an embodiment of the present invention with an energy density of about 42 MJ/kg. Furthermore, the calculations show that a minimum of 1.67 wt % $H_2$ content is needed in the slip syngas stream of 57171 kg/hr. In addition, it may not be possible to consume all the $H_2$ present in the slip stream. Assuming that 80 mol % $H_2$ can be utilized in the hydropyrolysis reactor, the actual $H_2$ content that is needed in the slip stream is 2.09 wt %. A hot slip stream of syngas (10.53 wt % of the original syngas stream) is withdrawn as slip stream from the coal gasifier and fed to the biomass hydropyrolysis unit. The slip stream of 10.53 wt % corresponds to 57171 kg/hr that is required for fluidization. Syngas is available from the gasifier exhaust at 1010° C. and 37.8 atm. From the syngas composition, $H_2$ content is calculated to be 2.65 wt % ($H_2$ content is 27.38 mol % which corresponds to $H_2$ partial pressure of 10.35 atm). Therefore, as available the syngas contains nearly 59% excess $H_2$ and can be directly used for the biomass fast hydropyrolysis process without any need for a water-gas shift reaction. The temperature of the slip syngas stream being fed to the hydropyrolysis reactor was adjusted to 800° C. Similar char and gas yield is assumed to be obtained from the hydropyrolysis reactor even though there is a possibility that char formation will decrease significantly under HDO conditions. The net loss in power production due to utilization of slip stream for biomass fast hydropyrolysis is estimated to be 2.05 MWe for the power plant to supply $H_2$ and process heat for the biomass fast hydropyrolysis process. To maintain both the same power production and the same coal feed, additional biomass is fed to the gasifier. The coal power plant electricity production efficiency is 40.6%. Assuming the same efficiency for the biomass co-fed power plant, and a biomass energy content of 17 MJ/kg of bone dry biomass, 1069.3 kg/hr of bone dry biomass is required. Thus, the process needs a total of 21,858.9 kg of biomass and 955.45 kg/hr of $H_2$ is required for hydropyrolysis. So, at constant power production and coal feed, the energy efficiency of the biomass hydropyrolysis process (with $H_2$ Lower Heating Value (LHV) of 120.1 MJ/kg and bio-oil LHV of 42 MJ/kg) is $$\frac{9108.9 \times 42}{21858.9 \times 17 + 955.45 \times 120.1} \times 100 = 78.7\%$$

Thus, conversion of biomass to liquid fuel via biomass fast hydropyrolysis using the process in accordance with an embodiment of the present invention has an energy efficiency of 78.7%. This energy efficiency is two times higher than the conventional gasification/FT process (38.4%) as illustrated in Example 1. As compared to conventional fast pyrolysis, the energy efficiency is similar but the integrated coal gasification-biomass fast hydropyrolysis process provides a bio-oil which has lower oxygen content and higher energy density that can be directly used by transportation sector whereas conventional pyrolysis bio-oil needs to be upgraded further.

Example 2

An Example of an energy efficiency comparison and a liquid fuel yield of the BTL and the GTL processes with a process in accordance with an embodiment of the present invention when NG is used as CCM is provided.

Example 2.1

Liquid Yield and Process Efficiency

The thermal efficiency of producing FT diesel (FTD) from methane via GTL is 63% (10). This means that 1 kmol of NG which has 801.363 MJ (14) will provide 504.86 MJ FTD. Using FTD energy content and density of 36.1 MJ/l and 0.847 kg/l respectively (20) means that 1 kmol of NG will yield 0.088 bbl of FTD. Also, 1 kmol of NG occupies 773.25 standard ft$^3$. Therefore, the estimated value of 0.088 bbl of FTD per 773.25 ft$^3$ from a stand-alone GTL corresponds well with literature references that 110 million ft$^3$/d of natural gas can be converted into 12500 b/d of high quality GTL product (21).

Accordingly, these numbers are used to calculate the GTL yields once the $H_2$ requirement is known for the $H_2$Bioil-NG process.

$H_2$ Yield from NG is Determined from the H2A Analysis

According to H2A data, 6981 moles of NG containing 90% methane yields 16102 moles of $H_2$ at 99.47% purity (20).

$$NG \text{ to } H_2 \text{ efficiency} = \frac{16102 \times 0.9947 \times 242}{6981 \times 0.9 \times 801.363} = 76.98\%$$

This value is in between the NRC's estimate of the current technology and a projected future value (74% vs. 78%) (11). Utilizing $H_2$ from NG for Biomass Fast Hydropyrolysis ($H_2$Bioil-NG)

From the earlier calculations, estimates for the hydropyrolysis of 20789.6 kg/hr of biomass required 955.5 kg/hr of $H_2$ in the $H_2$Bioil process (15, 22, 23) and yields 9108.9 kg/hr of bio-oil liquid fuel. So, the energy efficiency of $H_2$Bioil-NG process (with $H_2$ Lower Heating Value (LHV) of 120.1 MJ/kg and bio-oil LHV of 42 MJ/kg) can be easily calculated. The energy content of the NG needed to supply 955.5 kg/hr of $H_2$ is 149,060 MJ/hr. After accounting for the total energy content of the biomass to 353,420 MJ/hr (based on 17 MJ/kg of dry biomass), the $H_2$Bioil-NG process efficiency is calculated to be 76.2%. Using a density of 0.847 kg/l yields 4774.1 of ethanol gallon equivalents (ege)/hr. This corresponds to a yield of 229.64 ege/ton of biomass.

Liquid Fuel Yield for the Stand-Alone BTL and GTL Processes

Estimates are made for a stand-alone GTL process using the same amount of NG as the process in accordance with an embodiment of the present invention for the $H_2$Bioil-NG and another stand-alone BTL plant using the same amount of biomass as in the $H_2$Bioil-NG.

GTL: The $H_2$Bioil-NG process uses 149,060 MJ/hr of NG to supply 955.5 kg/hr of $H_2$. This amount of NG in a stand-alone GTL plant is estimated to produce 687.5 gal/hr of diesel, which is equivalent to 1170.7 ege/hr. This corresponds to 7.9 ege/1000 MJ of NG.

BTL: Using the Gasification/FT process, 20,789.6 kg of biomass will yield 1767.1 gal ege liquid fuel (85 ege/ton biomass).

Comparison of the Stand-Alone GTL+BTL Processes with $H_2$Bioil-NG

The combined yield from the individual BTL and GTL plants each using the same quantity of biomass and NG respectively as used by the $H_2$Bioil-NG is 2937.8 ege/hr. In contrast, the $H_2$Bioil-NG is estimated to provide 4774.1 ege/hr, which represents an increase by a factor of 1.63.

Example 2.2

Comparison of $H_2$Bioil-NG with $H_2$CAR-NG
Process in Energy Efficiency and Liquid Fuel Yield
Per Unit Input of Energy from NG In this example, the utilization of $H_2$ derived from NG in the $H_2$CAR ($H_2$CAR-NG) process described earlier by Agrawal et al. (14) does not demonstrate a benefit as compared to the stand-alone GTL and $H_2$Bioil processes. For the $H_2$CAR process, the biomass gasifier has a 74% efficiency and is used along with the H2A data to estimate liquid production (24). Thus, 83,334 kg of biomass is reacted with 8750 kmol of $H_2$ to produce 231.3 kmol of diesel via the $H_2$CAR process (14). In terms of energy content, 1,652,600 MJ of biomass reacts with 2,117,500 MJ of $H_2$ to form 2,161,700 MJ of diesel. The process energy efficiency is 57.3% and the liquid fuel yield is 184.1 gal/ton of biomass, which corresponds to 279 ege/ton biomass. The process efficiency when $H_2$ is obtained from NG will be 49.1% and for NG to $H_2$ the conversion efficiency will be 77%. The amount of NG used for the $H_2$CAR-NG process to produce 279 ege/ton of biomass is 33,000 MJ. This translates into 8.5 ege/1000 MJ of NG. In contrast, the $H_2$Bioil-NG process in accordance with an embodiment of the present invention uses 7168.3 MJ of NG to produce 229.6 ege/ton of biomass. This translates into 32 ege/1000 MJ of NG. Calculated earlier was that the stand-alone GTL process which yielded 7.9 ege/1000 MJ of NG. So, not only does the $H_2$Bioil-NG process have higher efficiency when compared to the $H_2$CAR-NG process (76.2% vs. 49.1%), the liquid fuel yield per unit of energy input from the NG is also higher (32 ege/1000 MJ of NG for $H_2$Bioil-NG vs. 8.5 ege/1000 MJ of NG for $H_2$CAR-NG vs. 7.9 ege/1000 MJ of NG for stand-alone GTL).

Yield Comparison on the Basis of Total Energy Input

In this example, the liquid fuel production based on the total energy input as NG and biomass are compared. For this purpose, 1000 MJ of total energy input is used as a basis. The liquid fuel yield for the $H_2$CAR-NG process is estimated to be 5.3 ege/1000 MJ of total energy input. In comparison, H$_2$Bioil-NG is estimated to yield 9.5 ege/1000 MJ of total energy input. Thus, in terms of liquid fuel yield per 1000 MJ of total energy input from biomass and NG, the H$_2$Bioil-NG process is still more efficient than the H$_2$CAR-NG process.

Example 2.3

Comparison of the Stand-Alone GTL and H$_2$Bioil-B with H$_2$Bioil-NG

A stand-alone H$_2$Bioil-B process utilizing H$_2$ from the gasification of Biomass itself is estimated to yield 140 ege/ton. Therefore, 20789.6 kg/hr of biomass will yield 2910.5 ege/hr. The H$_2$Bioil-NG process uses 149060 MJ/hr of NG to supply 955.5 kg/hr of H$_2$. This amount of NG in a stand-alone GTL plant is estimated to produce 687.5 gal/hr of diesel, which is equivalent to 1170.7 ege./hr. So, the total yield is 4081.2 ege/hr. Previously demonstrated is that the H$_2$Bioil-NG process with H$_2$ that is derived from NG yields 4774.1 ege/hr, which is still 17% higher. It is also important to note that biomass gasification used to provide the H$_2$ containing stream is expected to be much more costly than a simple process such as NG reforming used in the H$_2$Bioil-NG process.

While an exemplary embodiment incorporating the principles of the present invention has been disclosed herein, the present invention is not limited to the disclosed embodiment. Instead, this application is intended to cover any variations, uses, or adaptations of the inventions using its general principles. Further, this application is intended to cover such departures from the present disclosure as come within known or customary practice in the art to which this invention pertains and which fall within the limitations of the appended claims.

REFERENCES

1. G. W. Huber, S. Iborra, A. Corma, *Chem. Rev.* 106, 4044 (Sep. 13, 2006, 2006).
2. D. Mohan, C. U. Pittman, P. H. Steele, *Energy Fuels* 20, 848 (2006).
3. A. V. Bridgwater, G. V. C. Peacocke, *Renewable and Sustainable Energy Reviews* 4, 1 (2000).
4. D. C. Elliott, *Energy Fuels* 21, 1792 (2007).
5. D. C. Elliott, G. G. Neuenschwander, *Liquid fuels by low-severity hydrotreating of biocrude*. A. V. Bridgwater, D. G. B. Boocock, Eds., *Developments in Thermochemical Biomass Conversion* (1996), pp. 611-621.
6. A. V. Bridgwater, *Chemical Engineering Journal* 91, 87 (Mar. 15, 2003).
7. J. D. Rocha, C. A. Luengo, C. E. Snape, *Organic Geochemistry* 30, 1527 (1999).
8. H. F. Gercel, A. E. Putun, E. Putun, *Energy Sources* 24, 423 (2002).
9. J. Dilcio Rocha, C. A. Luengo, C. E. Snape, *Organic Geochemistry* 30, 1527 (1999).
10. A P Steynberg, M. E. Dry, *Studies in Surface Science and Catalysis* 152 (2004).
11. NRC, *The NRC report—The Hydrogen Economy—Opportunities, Costs, Barriers, and R&D Needs* (The National Academies Press, Washington D C, 2004), pp.
12. Hugo Bos, F. v. Dongen, *Gasification Conference Pittsburgh* (September 2005).
13. M. C. Woods et al., *COE/NETL*-2007/1281 http://www.netl.doe.gov/energy-analyses/pubs/Bituminous%20Baseline_Final%20Report.pdf (May 2007).
14. R. Agrawal, N. R. Singh, F. H. Ribeiro, W. N. Delgass, *PNAS* 104, 4828 (Mar. 20, 2007, 2007).
15. Rakesh Agrawal, Manju Agrawal, Navneet R. Singh, Pending U.S. Patent application Provisional No. 60/968, 194 (2007).
16. M. J. Prins, K. J. Ptasinski, F. J. J. G. Janssen, *Fuel Processing Technology* 86, 375 (2005).
17. X. Li, J. R. Grace, A. P. Watkinson, C. J. Lim, A. Ergudenler, *Fuel* 80, 195 (2001).
18. Z. Yuehong, W. Hao, X. Zhihong, *Energy Conversion and Management* 47, 1416 (2006).
19. M Ringer, V Putsche, J. Scahill, NREL/TP-510-37779 http://www.nrel.gov/docs/fy07osti/37779.pdf (November 2006).
20. M. D. Rutkowski, http://www.hydrogen.energy.gov/h2a_prod_studies.html (2005).
21. N. Fabricius, *Petroleum Economist Fundamentals of Gas to Liquids,* 12 (2005).
22. Rakesh Agrawal, Navneet R Singh, Pending U.S. Patent application Provisional No. 60/968,190 (2007).
23. M Ringer, V Putsche, J. Scahill, NREL/TP-510-37779 http://www.nrel.gov/docs/fy07osti/37779.pdf (2006).
24. M. K. Mann, http://www.hydrogen.energy.gov/h2a_analysis.html (2005).

The invention claimed is:

1. A method for producing liquid hydrocarbons from a biomass, the method comprising:
    hydropyrolizing the biomass with a gaseous exhaust stream formed from gasification and/or reforming of a carbon-containing moiety (CCM), the gaseous exhaust stream comprising hydrogen (H$_2$) and a material selected from the group consisting of carbon monoxide (CO), carbon dioxide (CO$_2$), water (H$_2$O), and combinations thereof;
    wherein the hydropyrolizing comprises fast pyrolysis in presence of hydrogen.

2. The method according to claim 1, wherein the gaseous exhaust stream is used for the hydropyrolizing without separating out the CO, the CO$_2$, the H$_2$O and the H$_2$ subsequent to being formed by the gasification and/or reforming.

3. The method according to claim 2, wherein pollutants are removed from the CCM prior to the gasification and/or reforming of the CCM.

4. The method according to claim 2, wherein the gaseous exhaust stream is free of cooling between the gasification and/or reforming of the CCM via a gasifier/reformer and the hydropyrolizing via a biomass hydropyrolysis unit.

5. The method according to claim 1 further comprising cooling and water-gas shift reacting the gaseous exhaust stream to increase concentration of the H$_2$ in the gaseous exhaust stream, and then successively reheating the gaseous exhaust stream, and feeding the gaseous exhaust stream to a hydropyrolysis reactor.

6. The method according to claim 1, wherein the CCM comprises a carbon-containing material that forms syngas during the gasification and/or reforming to define the gaseous exhaust stream, the carbon-containing material comprising pet coke, methane, natural gas, naphtha, coal, biomass, municipal waste, or a mixture thereof.

7. The method according to claim 1, wherein the liquid hydrocarbons comprise chemically bonded carbon and hydrogen atoms, and are in liquid form when in a closed container at a temperature of 20° C. and a pressure of 1 atmosphere.

8. The method according to claim 1, wherein the liquid hydrocarbons comprise methanol, ethanol, long chain alcohols, alkanes, alkenes, aromatics, substituted aromatics compounds thereof or mixtures thereof.

9. The method according to claim 1, wherein the biomass comprises carbon, plant material, tree material, aquatic material or a mixture thereof.

10. The method according to claim 1, wherein the gaseous exhaust stream defines syngas and the hydropyrolizing occurs in a hydropyrolysis reactor, and wherein the biomass and the syngas react in the hydropyrolysis reactor to define fast hydropyrolysis.

11. The method according to claim 10, wherein a residence time of the biomass reacting with the syngas in the hydropyrolysis reactor is less than about 1 minute.

12. The method according to claim 10, wherein a temperature during fast hydropyrolysis is between about 400° C. and about 600° C.

13. The method according to claim 10, wherein the hydropyrolysis reactor comprises a hydrodeoxygenation (HDO) catalyst facilitating fast hydropyrolysis.

14. The method according to claim 13, wherein the hydropyrolysis reactor further comprises sand mixed with the HDO catalyst and a water-gas shift (WGS) catalyst, and wherein the WGS catalyst is mixed with and disposed on the sand.

15. The method according to claim 10, wherein the hydropyrolizing produces a gas-phase effluent, and the method further comprises sending at least a majority of the gas-phase effluent to a hydrodeoxygenation reactor.

16. The method according to claim 15, wherein the sending of the gas-phase effluent comprises removing char from the gas-phase effluent prior to reception of the gas-phase effluent by the hydrodeoxygenation reactor.

17. The method according to claim 15, wherein the gasification and/or reforming of the CCM is conducted in the hydropyrolysis reactor providing the syngas in-situ and process heat for fast-hydropyrolysis of the biomass.

18. The method according to claim 15, wherein the gasification and/or reforming of the CCM occurs in a reformer, and wherein the CCM comprises natural gas (NG) and at least a portion of the gas-phase effluent, the NG being a lesser proportion of the CCM than the gas-phase effluent.

19. The method according to claim 18, wherein a portion of the gas-phase effluent is separated into a $CO_2$-rich stream and a $CO_2$-deficient stream, wherein the $CO_2$-rich stream is fed to burners of the reformer, and wherein the $CO_2$-deficient stream is sent to the reformer for reforming.

20. The method according to claim 15, wherein the hydrodeoxygenation reactor comprises a hydrodeoxygenation (HDO) catalyst.

21. The method according to claim 20 wherein the hydrodeoxygenation reactor further comprises a water-gas shift (WGS) catalyst.

22. The method according to claim 21, wherein the WGS catalyst is disposed within the hydrodeoxygenation reactor such that the gas-phase effluent interfaces with the WGS catalyst prior to interfacing with the HDO catalyst.

23. The method according to claim 21, wherein the WGS catalyst comprises a linearly decreasing or a sharply decreasing profile within the hydrodeoxygenation reactor.

24. The method according to claim 21, wherein the WGS catalyst is interspersed with the HDO catalyst.

25. The method according to claim 20, wherein the HDO catalyst comprises a multifunctional catalyst having both WGS and HDO activity.

26. The method according to claim 20, wherein a temperature of the gas-phase effluent being fed to the hydrodeoxygenation reactor is adjusted prior to reception of the gas-phase effluent by the hydrodeoxygenation reactor.

27. The method according to claim 26, wherein a temperature of the hydrodeoxygenation reactor is lower than the temperature of the gas-phase effluent prior to adjustment.

28. The method according to claim 15, wherein the hydrodeoxygenation reactor comprises a fixed bed reactor.

29. The method according to claim 15, wherein the hydrodeoxygenation reactor comprises a fluidized bed reactor.

30. The method according to claim 15, wherein effluent from the hydrodeoxygenation reactor is cooled to a condensed liquid bio-oil that is collected as a product stream.

31. The method according to claim 30, wherein at least a portion of the syngas is fed to the hydrodeoxygenation reactor.

32. The method according to claim 30, wherein the gaseous exhaust stream supplies substantially all process heat requirements for the hydropyrolizing.

33. The method according to claim 32, wherein a heat transfer process involving sand recirculation is not used to supplement the process heat requirements for the hydropyrolizing.

34. The method according to claim 30, wherein the sending of the gas-phase effluent comprises removing char from the gas-phase effluent, and wherein the method further comprises sending a portion of the char to a combustor to produce heat, thereby supplying process heat for the gasification and/or reforming of the CCM.

35. The method according to claim 30, wherein the effluent from the hydrodeoxygenation reactor comprises unreacted syngas and non-condensable gases formed during the hydropyrolizing, and wherein the unreacted syngas and non-condensable gases are collected and separated from the bio-oil.

36. The method according to claim 35 wherein at least a portion of the collected unreacted syngas and non-condensable gases is combusted to provide heat for the gasification and/or reforming of the CCM.

37. The method according to claim 35, wherein at least a portion of the collected unreacted syngas and non-condensable gases is sent to a gas turbine for power production.

38. The method according to claim 30, wherein a HDO catalyst is used in the hydropyrolysis reactor and/or the hydrodeoxygenation reactor.

39. The method according to claim 30, wherein the gas-phase effluent comprises unreacted syngas and is sent to the hydrodeoxygenation reactor for use therein.

* * * * *